US006968380B1

(12) United States Patent
Singhal et al.

(10) Patent No.: US 6,968,380 B1
(45) Date of Patent: Nov. 22, 2005

(54) METHOD AND SYSTEM FOR INCREASING EASE-OF-USE AND BANDWIDTH UTILIZATION IN WIRELESS DEVICES

(75) Inventors: Sandeep Kishan Singhal, Raleigh, NC (US); Edith Helen Stern, Boca Raton, FL (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 09/585,231

(22) Filed: May 30, 2000

(51) Int. Cl.[7] .......... G06F 15/173

(52) U.S. Cl. .......... 709/226; 709/222; 709/225; 709/227; 709/228

(58) Field of Search .......... 709/222, 225, 709/226, 227, 228, 232, 246

(56) References Cited

U.S. PATENT DOCUMENTS

| | | | | |
|---|---|---|---|---|
| 5,875,446 | A * | 2/1999 | Brown et al. | 707/3 |
| 5,991,735 | A * | 11/1999 | Gerace | 705/10 |
| 5,999,929 | A * | 12/1999 | Goodman | 707/7 |
| 6,009,410 | A * | 12/1999 | LeMole et al. | 705/14 |
| 6,009,459 | A | 12/1999 | Belfiore et al. | |
| 6,014,090 | A | 1/2000 | Rosen et al. | |
| 6,047,327 | A | 4/2000 | Tso et al. | |
| 6,049,821 | A * | 4/2000 | Theriault et al. | 709/203 |
| 6,092,100 | A | 7/2000 | Berstis et al. | |
| 6,101,472 | A * | 8/2000 | Giangarra et al. | 704/275 |
| 6,157,705 | A | 12/2000 | Perrone | |
| 6,202,023 | B1 * | 3/2001 | Hancock et al. | 701/201 |
| 6,219,696 | B1 | 4/2001 | Wynblatt et al. | |
| 6,247,048 | B1 | 6/2001 | Greer et al. | |
| 6,282,511 | B1 * | 8/2001 | Mayer | 704/270 |
| 6,338,082 | B1 | 1/2002 | Schneider | |
| 6,351,467 | B1 | 2/2002 | Dillon | |
| 6,353,398 | B1 * | 3/2002 | Amin et al. | 340/995.12 |
| 6,353,839 | B1 | 3/2002 | King et al. | |
| 6,363,419 | B1 * | 3/2002 | Martin et al. | 709/219 |
| 6,519,646 | B1 * | 2/2003 | Gupta et al. | 709/229 |
| 6,522,875 | B1 * | 2/2003 | Dowling et al. | 455/414.3 |
| 6,526,439 | B1 | 2/2003 | Rossmann et al. | |
| 6,546,002 | B1 * | 4/2003 | Kim | 370/351 |
| 6,560,640 | B2 * | 5/2003 | Smethers | 709/219 |
| 6,564,254 | B1 | 5/2003 | Shoji et al. | |
| 6,604,076 | B1 * | 8/2003 | Holley et al. | 704/270.1 |
| 6,610,105 | B1 * | 8/2003 | Martin et al. | 715/513 |
| 6,618,726 | B1 * | 9/2003 | Colbath et al. | 707/6 |
| 6,631,496 | B1 * | 10/2003 | Li et al. | 715/501.1 |
| 6,654,813 | B1 | 11/2003 | Black et al. | 709/245 |
| 6,671,738 | B1 * | 12/2003 | Rajchel et al. | 709/245 |
| 6,707,809 | B1 * | 3/2004 | Warrier et al. | 370/351 |
| 6,708,206 | B1 * | 3/2004 | Thrane et al. | 709/219 |
| 6,715,131 | B2 * | 3/2004 | Martin et al. | 715/526 |

* cited by examiner

FOREIGN PATENT DOCUMENTS

| | | |
|---|---|---|
| WO | WO 99/45732 | 10/1999 |

*Primary Examiner*—Saleh Najjar
(74) *Attorney, Agent, or Firm*—Sawyer Law Group LLP

(57) ABSTRACT

A method and system for increasing ease-of-use and bandwidth utilization in a wireless device capable of accessing a communication network is disclosed. The present invention receives information about the wireless device's environment, and then uses the environment to determine web sites most likely to be requested. Identifiers of the web sites most likely to be requested are then pushed to the wireless device for selection by the user. In a further aspect of the present invention, the wireless device may also pre-fetch contents from the identified web sites in times when bandwidth is not in use to further speed responsiveness of the device.

52 Claims, 6 Drawing Sheets

Service Database Process

Wireless Device Process

METHOD AND SYSTEM FOR INCREASING EASE-OF-USE AND BANDWIDTH UTILIZATION IN WIRELESS DEVICES

CROSS-REFERENCE TO RELATED APPLICATIONS

The present invention is related to co-pending U.S. patent application Ser. No. 09/583,318 entitled "Method And System For Increasing Ease-Of-Use And Bandwidth Utilization In A Wireless Device," (BOC9-2000-0023/1759P) which is assigned to the assignee of the present application and filed on the same date as the present application.

FIELD OF THE INVENTION

The present invention relates to a method and system for increasing ease-of-use and bandwidth utilization in a wireless device, and more particularly, to a method and system for providing an environment-sensitive user interface for such devices.

BACKGROUND

The Internet and Internet access are experiencing phenomenal growth with more and more people taking advantage through personal computers, and more recently, network computers. This growth is about to take a giant leap forward with the explosion of portable devices capable of wireless data communication, including communication to the Internet. Examples of portable wireless devices include PDAs and cellphones.

User friendliness is of key importance in the acceptance of such devices; more so than for personal computers (PCs). When a new generation of PCs is made available, users of the new PCs are generally veteran, sophisticated users of the previous generations of PCs. With portable wireless devices, it is expected that the previous experience of users will be more in the nature of cellphone experience. That is, users of these devices may be inexperienced and unsophisticated data communicators. Therefore, ease-of-use will be a distinct differentiator in the marketplace for wireless Internet-enabled devices.

There are many trade-offs required to use wireless devices. The small size of the device means a small screen and keyboard, or touchscreens, if any, with corresponding difficulties in data entry. Consequently, entering uniform resource locators (URLs) into the wireless device can be cumbersome and tedious to the user. Furthermore, the bandwidth of data communications is also limited, meaning that it may take significant amounts of time to receive web data from the URLs.

Accordingly, what is needed is an improved method and system for increasing ease-of-use and bandwidth utilization in a wireless Internet-enabled device. The present invention addresses such a need.

SUMMARY

The present invention provides a method and system for increasing ease-of-use and bandwidth utilization in a wireless device capable of accessing a communication network. The present invention receives information about the wireless device's environment, and then uses the environment to determine web sites most likely to be requested. Identifiers of the web sites most likely to be requested in that environment are then pushed to the wireless device for selection by the user. In a further aspect of the present invention, the wireless device may also pre-fetch contents from the identified web sites in times when bandwidth is not in use to further speed responsiveness of the device.

According to the present invention, web site identifiers, such as URLs, are automatically downloaded and cached on portable wireless devices, and then presented to the user based on environment and presumed interest, thereby providing an environment-sensitive user interface that is both easy to use and increases bandwidth utilization.

DETAILED DESCRIPTION

The present invention relates to increasing ease-of-use and bandwidth utilization in a portable wireless device using data mining and an environment-sensitive user interface. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
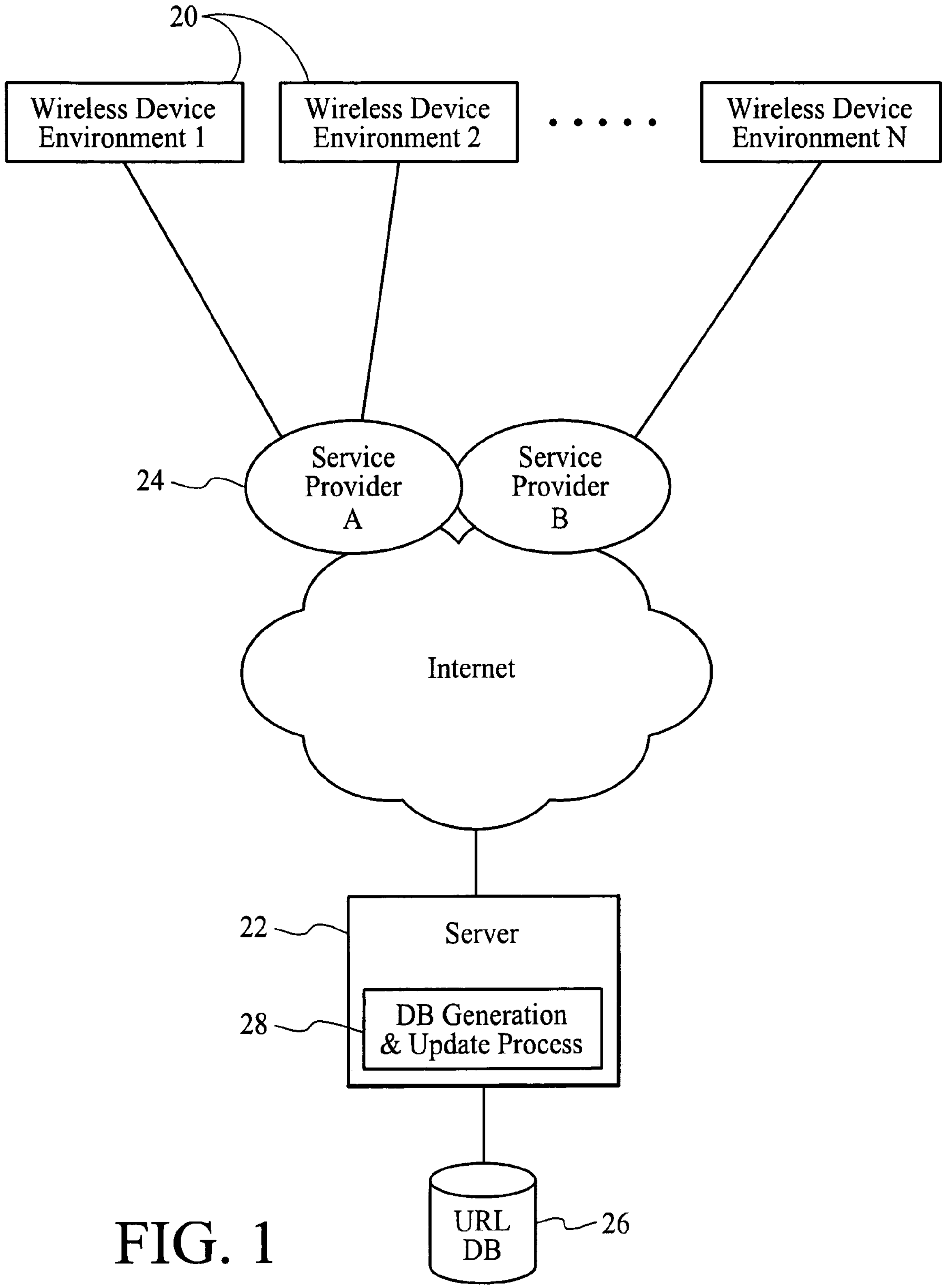
FIG. 1 is a diagram illustrating a system environment in which the present invention resides.

FIG. 1 is a diagram illustrating a system environment in which the present invention resides. In a preferred embodiment, one or more portable wireless devices 20 in various environments are in communication with a server 22 over the Internet. Each of the wireless devices 20 is connected to the Internet via a service provider 24, which may comprise a wireless carrier and/or an internet service provider (ISP) that is capable of servicing many wireless devices 20 simultaneously. In a preferred embodiment, the server 22 maintains a database 26 of web site identifiers that are categorized by environmental factors such that when the database is queried with the information about the current environment of a wireless device 20, the database 26 returns a set of identifiers to the device 20 anticipated to be most likely accessed by users in that environment. In a preferred embodiment, environmental factors include items such as location of access, local weather, time and date, or any combination thereof. These could be further modified by user preferences. In a preferred embodiment, the identifiers of the web sites stored in the database 26 represent URLs. The URL database 26 is maintained through a database 26 generation and update process 28.

Although the present invention is explained in terms of the wireless devices 20 being in wireless communication with the Internet through a service provider 24, it should be understood that the present invention may also be used where portable devices are connected to any type of communication network, such as intranets, and where the portable devices are physically connected to the network. In addition, although in a preferred embodiment the server 22 is maintained by one of the service providers 24, the server 22 may also be maintained by an independent service that offers location sensitive services to the service provider 24 for a fee.

In an alternate embodiment within service providers 24 there may be a cache copy of the environment database 26, maintained by server 22. Interactions with wireless devices 20 are then serviced by the caches within service providers 24. These caches may be maintained by the service provider 24; they may be maintained by the service maintaining database 26 associated with server 22 or they may be maintained by a third party caching service on behalf of the service maintaining the server 22, the service providers 24 or some additional party.

Figure 2:
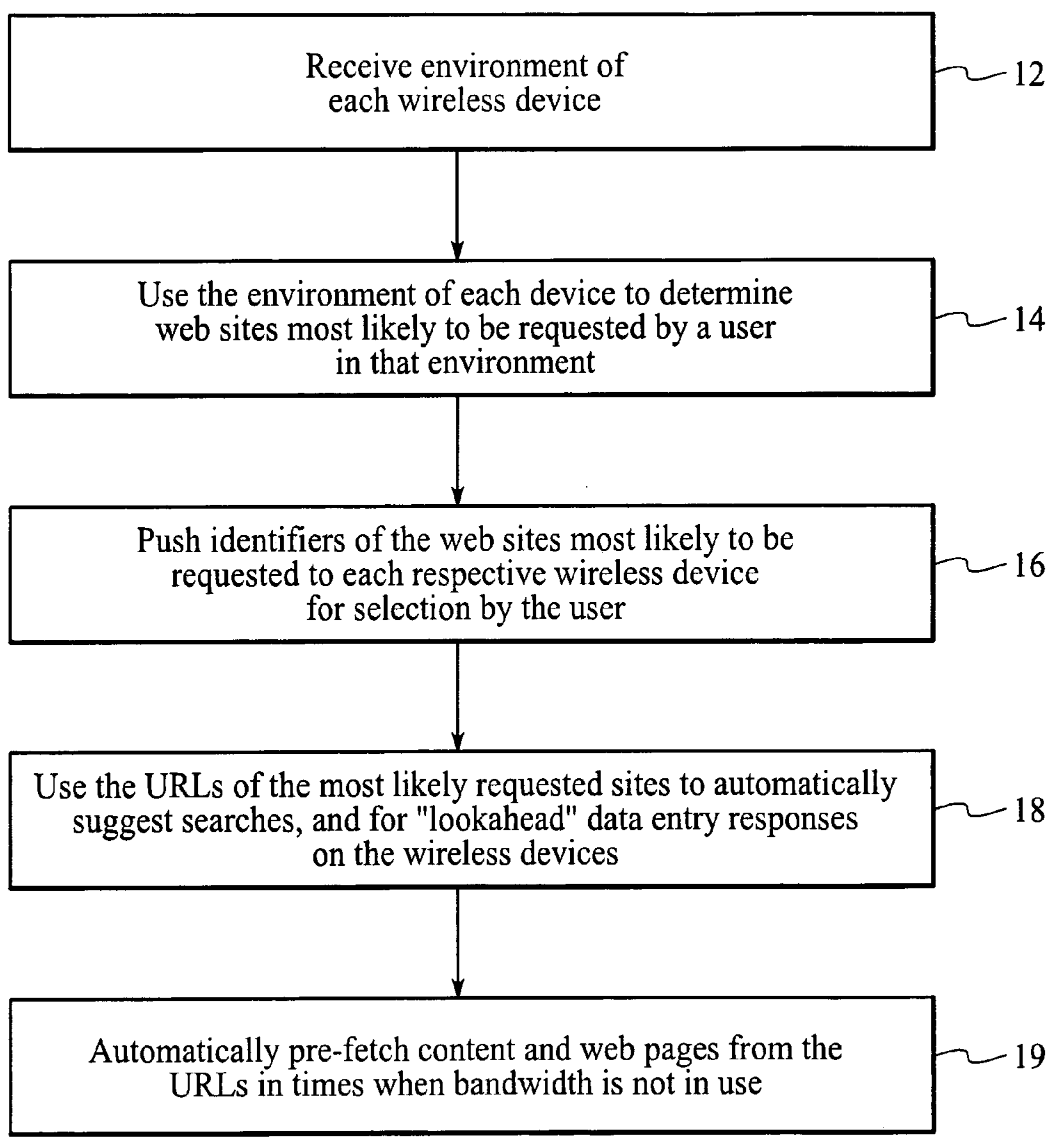
FIG. 2 is a flow chart illustrating the process of increasing ease-of-use and bandwidth utilization in a wireless device capable of accessing the Internet in accordance with the present invention.

FIG. 2 is a flow chart illustrating the process of increasing ease-of-use and bandwidth utilization in a wireless device 20 capable of accessing the Internet in accordance with the present invention. The process begins by receiving information about the environment of each of the wireless devices 20 in step 12, where the environment information includes any combination of geographic location, time and date, local weather and so on. The environment information of each device 20 and optional other information are then used to determine web sites most likely to be requested by a user in that environment in step 14. The server 22 then automatically pushes identifiers (preferably URLs) of the web sites most likely to be requested to each respective wireless device 20 for selection by the user in step 16. The URLs of the most likely requested sites may then be used to automatically suggest searches, and for "lookahead" data entry responses on the wireless devices 20 in step 18. The wireless devices 20 may also automatically pre-fetch content and web pages from the URLs in times when bandwidth is not in use to further speed responsiveness of the devices 20 in step 19.

The following scenario illustrates the problem encountered by a user of a wireless device 20, such as a web-enabled cellphone (web phone), and the advantage conferred by the present invention when geographic location is used as the environmental factor. In this scenario, a family is shopping for a car and is carrying a web phone. As the family walks the car lot, they would like to use the web phone to access web sites for safety information, consumer reports on different car models, and perhaps a Better Business Bureau report on any complaints about this particular merchant. The family may not know that the Better Business Bureau report exists, but once apprised of its existence, the family will access it. Assume further that the family may never have accessed any of these web sites before.

With the present invention, the scenario continues as follows. The location of the web phone is identified through one of several means and relayed to the ISP or portal serving the user. In a preferred embodiment of the present invention, the location of the web phone may be established by a GPS chip in the phone, which will report the location to the phone so that the phone may relay the location to the server 22. In a second embodiment, the location of the phone may be determined via a user data entry of a street address. In a third embodiment, the location of the phone is determined by the wireless carrier that identifies which cell the web phone is operating, or using other 911-like means of location identification, and passing the information to the server 22. In a fourth embodiment, the communication method is a narrow range wireless method, such as bluetooth, and location knowledge is implicit in the cell or picocell which has made contact with the cellphone. For example, data regarding the web sites may be served by a server at the car lot. This fourth embodiment may be a less favorable method of distribution to the user because a biased view of the data or set of links may be presented. In a fifth embodiment, local cells are equipped with a GPS device, and location information is transmitted to the wireless devices, which then pass on the location to the server 22.

After the server 22 receives the location of the web phone, the server 22 uses the location to query past history of data access from that location to determine the most popular web sites or other content accessed. That is, the server 22 finds the most frequently accessed sites from the car lot. In a preferred embodiment of the present invention, the server 22 pushes the URLs or other identifiers of the top web sites to the web phone. Additionally, for some web sites, the server 22 may push the data from the sites (with appropriate transcoding) to the web phone, or the web phone may pre-fetch URLs on the assumption that they are likely to be requested by the user. When the family decides to access content, the web phone may or may not indicate what has been pre-fetched. If the family begins to enter a request, the web phone uses the URLs for "lookahead" data entry to suggest the most likely site, or search argument. In a alternative embodiment, the wireless device 20 presents the URL's as a menu to the users for selection.

Figure 3:
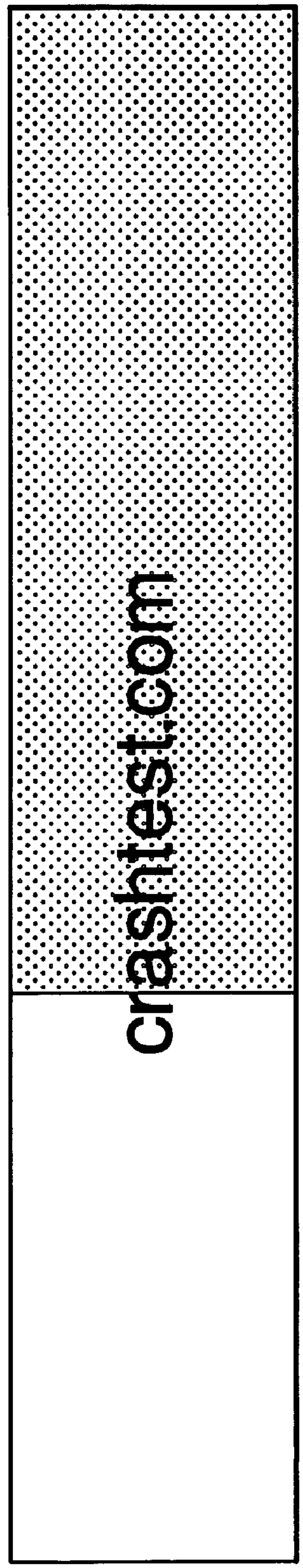
FIG. 3 is a diagram of an entry window on a wireless device illustrating lookahead data entry.

FIG. 3 is a diagram of an entry window on a wireless device 20 illustrating lookahead data entry. In this example, the user has started to type the word "crash". Assuming that one of the cached URLs is "http://www.crashtest.com", then in response to the user entering "cr", the wireless device 20 automatically suggests the crashtest.com web site. If this is a site that interests the user, then the user may hit the equivalent of "enter" to make the request. If the user were to type another letter, the device 20 would try to suggest another site. Typeahead features are common with Web browsers in which suggestions for web sites are based on previous requests from the user. According to the lookahead feature of the present invention, however, the suggestions made may have never before been entered by the user and may have no long-term interest to the user, but are available based on location and presumed interest.

As a further example, assume that in the above scenario, local weather is used as the environmental factor, and that it begins to rain on the family at the car lot. In this case, the database 26 may return URLs to the family's web phone about local places to buy umbrellas, for instance.

In a second preferred embodiment of the invention, a location specific welcome page (LSWP) is prepared and periodically sent to the wireless device 20. The LSWP is a visual representation of the URL's determined by the database to be revelant to the specific location. The LSWP may be sent by the server 22, the service provider 24, or a third party. The LSWP may include icons representing the anticipated most valued sites, and may also include personalization based on user demographics or profile. In the scenario above, the LSWP would display icons for consumer reports on cars, crash tests, and so on. To acquire the desired information, the user would simply touch one of the icons, rather than typing in a URL. While this page may be pre-cached on the wireless device 20, such a scheme allows an incorrect LSWP to be displayed should the user change location into a non-accessible spot. The preferred embodiment, therefore, is for the LSWP to be sent on demand, rather than having it pre-cached. When demanded, the LSWP may either be pre-existing or dynamically created with the appropriate data and icons.

Figure 4:
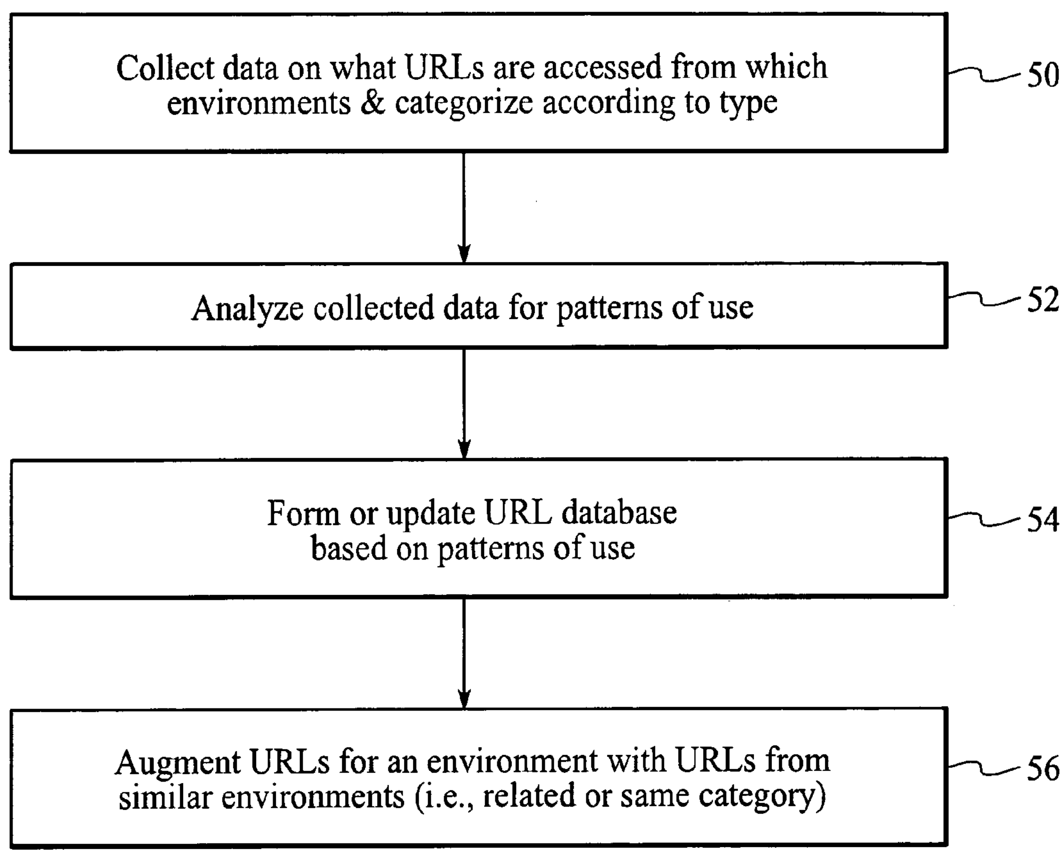
FIG. 4 is a flow chart illustrating the database generation and update process implemented by the server in accordance with the present invention.

FIG. 4 is a flow chart illustrating the database generation and update process 28 implemented on the server 22 in accordance with the present invention. The process begins by collecting information from the service provider 24 indicating which URLs are accessed in what environments by the wireless devices 20, and categorizing the URLs according to type of environment in step 50. Where geographic location is collected, for example, the size and the type of the locations may be defined specifically or generally. For example, the size of the location may be defined as a five-mile or one-half mile area. The type of location, such as a car lot, may be categorized as "Ford new cars", "cars", or "trucks".

After categorizing the URLs, the server 22 analyzes the data collected for each environment for patterns of use in step 52. In a preferred embodiment, the URLs most widely accessed in any given environment are assigned a higher priority. Access patterns are also analyzed according to other factors, such as time (e.g., day the week) and weather. In addition, patterns of use in similar environments may also be used for the current environment. The pattern of use analysis can be performed real-time and ongoing, or can be non real-time.

The patterns of use and server policies are then used to form a URL database 26 in step 54. The patterns of use and server policies are also used to update and query the URL database 26. When queried with information about a particular environment, the database 26 fetches a set of URLs most likely to be accessed by a user in that environment for opportunistic caching at a particular wireless device 20. Server policies will define how many sites to recognize, advertising contracts, which sites to present iconically (e.g., top five, best five with advertising, etc.), which URLs to cache at the device 20, and so on. URLs from associated category sites may optionally be added.

Figure 5:
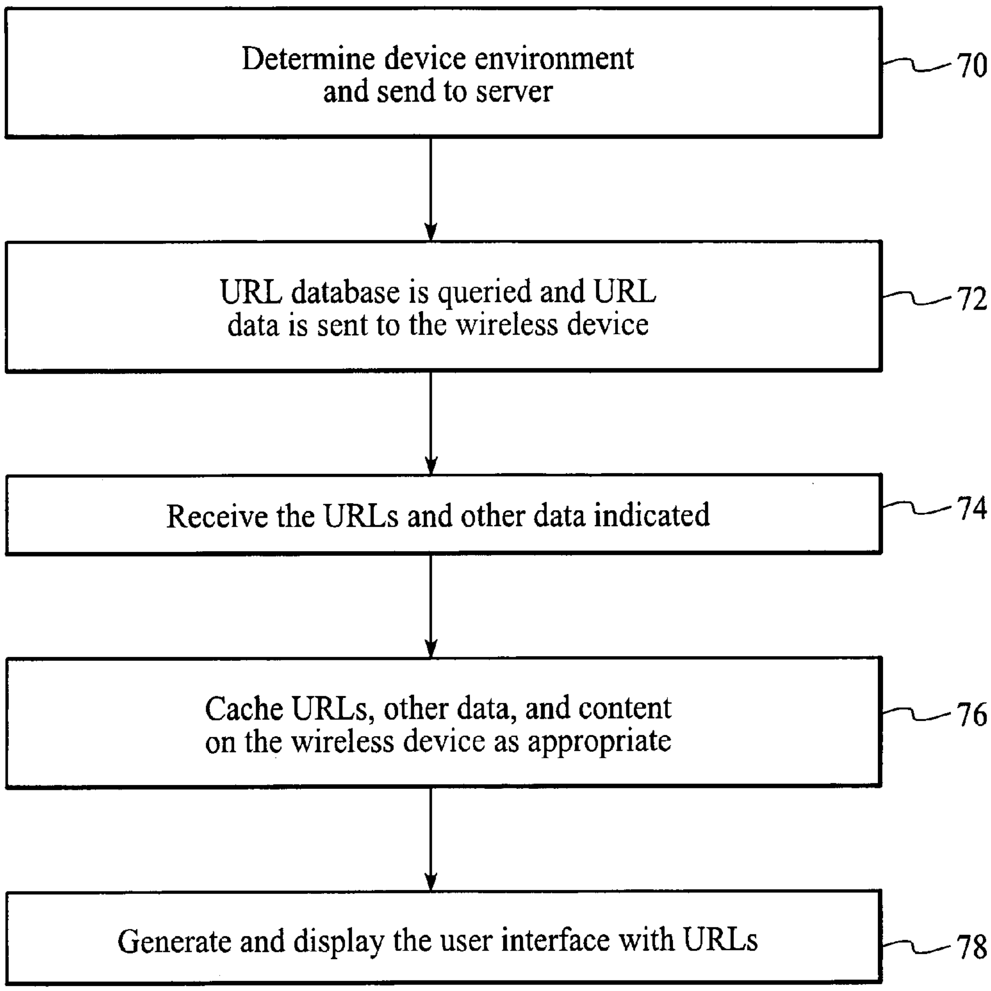
FIG. 5 is a flow chart of caching URLs on a wireless device in accordance with the present invention.

FIG. 5 is a flow chart of caching URLs on a wireless device 20 in accordance with the present invention. The wireless device 20 first determines information about its environment, such as geographic location, and sends the data to the server 22 providing the environment services in step 70. In a preferred embodiment, the device 20 determines the environment periodically. The environment may be determined on demand, however, some of the advantages provided by the invention to even-out bandwidth utilization could be lost. As described above, the environment factors can be obtained automatically through one of several methods, including GPS, or manually through user entry. In a preferred embodiment, the wireless device 20 determines the environment, rather than having the environment determined by the service provider 24.

The environment data is then used by the server 22 to query the URL database 26, and results are sent back to the device 20 in step 72. The result may include URLs, URL keywords, URL icons with identifying text, speech annotations, and content from a limited number of sources, such as web sites. To produce results tailored to the user, the query may also have included personalization information about the requesting user. The personalization information may include data on device capability, user profile, demographics, and so on.

The wireless device 20 receives the URL results in step 74, and caches the URL results for selection by the user in step 76. Optionally, the wireless device 20 may inform the user that results have been received. The notification may be audible (such as an alarm), may be visible (such as a data-waiting light), or may be tactile (such as the non-audio vibrations that pagers employ for silent notification). In one preferred embodiment, the device 20 generates and then displays a list of the URLs in the environment sensitive user interface in step 78.

Figure 6:
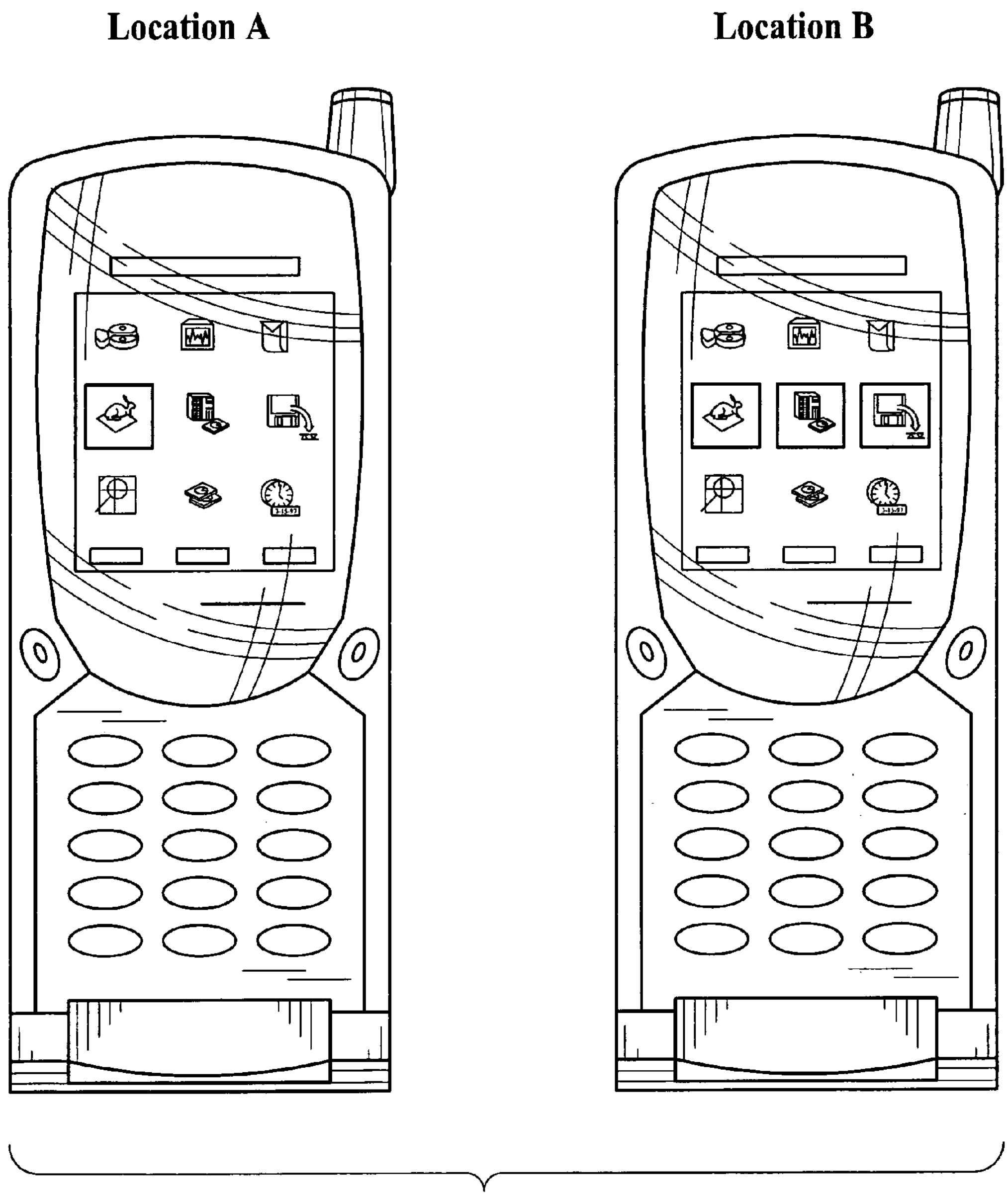
FIG. 6 is a block diagram showing an example web phone displaying the location sensitive user interface of the present invention at two different locations.

FIG. 6 is a block diagram showing an example web phone displaying the environment sensitive user interface of the present invention at two different locations. At location A, one set of URL icons is displayed based on presumed interest, while at location B, a different set of URL icons is displayed, again based on presumed interest, but with no user interaction required.

The user friendliness of the service provided by the present invention can be augmented by combining the present invention with UI's other than touch screen or keyboard. In another embodiment of the present invention, in addition to the URLs, associated keyword URLs (kURLs) are also cached at the wireless device 20. In this embodiment, knowledge of the location allows the service provider 24 to prep the device 20 with many locally significant keywords in devices 20 that allows a measure of speech recognition. When the user speaks a request, such as "car safety records", the request is recognized and matched against the limited vocabulary based on the kURLs cached at the wireless device 20. More specifically, when the user speaks a word or phrase, the wireless device recognizes the words, performs a keyword match on the kURLs, and then displays iconic choices best matching the spoken request for one touch access.

A method and system for increasing ease-of-use and bandwidth utilization in a wireless device has been disclosed in which URLs are datamined on a server, sent to the device, cached, and then presented to the user through an environment sensitive user interface. The present invention has been described in accordance with the embodiments shown, and one of ordinary skill in the art will readily recognize that there could be variations to the embodiments, and any variations are within the spirit and scope of the present invention. For example, it should be understood that the functions provided by the present invention may be implemented in software that is resident on computer-readable mediums in different locations within the network, such as in the server, the wireless devices, and/or other locations and devices. Accordingly, many modifications may be made by one of ordinary skill in the art without departing from the spirit and scope of the appended claims.

What is claimed is:

1. A method for increasing ease-of-use and bandwidth utilization in a wireless device capable of accessing a communication network, comprising the steps of:

(a) maintaining a database of web site identifiers that are categorized by environmental factors;

(b) receiving environment information by a network server about the wireless device's environment;

(c) querying the database using the environment information to determine particular web sites most likely to be requested by a user of the wireless device in that environment, wherein the particular web sites are determined by examining prior patterns of access of web sites in the environment of the wireless device by users of the communication network; and (d) pushing identifiers of the particular web sites identified to be most likely to be requested to the wireless device for selection by the user, wherein server policies determine which web site identifiers are sent to the device.

2. The method of claim 1 further including the step of providing geographic location as the environment information.

3. The method of claim 1 further including the step of providing local weather as the environment information.

4. The method of claim 1 further including the step of providing time and date as the environment information.

5. The method of claim 1 further including the step of personalizing which identifiers are pushed based on personalization information.

6. The method of claim 1 further including the step of providing URLs as the identifiers.

7. The method of claim 1 further including the step of sending a location specific welcome page (LSWP) to the wireless device for display.

8. The method of claim 1 further including the step of pushing keyword URLs to the wireless device for speech recognition matching.

9. A system for increasing ease-of-use and bandwidth utilization in a wireless device capable of accessing a communication network, comprising:

database means for storing web site identifiers that are categorized by environmental factors;

network server means for receiving environment information about the wireless device's environment;

means for querying the database using the environment information to determine particular web sites most likely to be requested by a user of the wireless device in that environment, wherein the particular web sites are determined by examining prior patterns of access of web sites in the environment of the wireless device by users of the communication network; and means for pushing identifiers of the particular web sites identified to be most likely to be requested to the wireless device for selection by the user, wherein server policies determine which web site identifiers are sent to the device.

10. The system of claim 9 wherein the environment information comprises geographic location.

11. The system of claim 9 wherein the environment information comprises local weather.

12. The system of claim 9 wherein the environment information comprises time and date.

13. The system of claim 9 further including means for personalizing which identifiers are pushed based on personalization information.

14. The system of claim 9 wherein the identifiers comprise URLs.

15. The system of claim 9 wherein a location specific welcome page (LSWP) is sent to the wireless device for display.

16. The system of claim 9 wherein keyword URLs are pushed to the wireless device for speech recognition matching.

17. The system of claim 9 further comprising means for automatically pushing content from one or more of the identified web sites to the device in times when bandwidth is not in use to speed responsiveness of the device.

18. The system of claim 9 wherein the web site identifiers most likely to be requested are for web sites which have been most frequently requested by the users accessing the communication network when located in the current environment of the wireless device.

19. The system of claim 9 wherein the web site identifiers are categorized in types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

20. A computer-readable medium containing program instructions for increasing ease-of-use and bandwidth utilization in a wireless device capable of accessing a communication network, the program instructions for:

(a) maintaining a database of web site identifiers that are categorized by environmental factors;

(b) receiving environment information by a network server about the wireless device's environment;

(c) querying the database using the environment information to determine particular web sites most likely to be requested by a user of the wireless device in that environment, wherein the particular web sites are determined by examining prior patterns of access of web sites in the environment of the wireless device by users of the communication network; and (d) pushing identifiers of the particular web sites identified to be most likely to be requested to the wireless device for selection by the user, wherein server policies determine which web site identifiers are sent to the device.

21. The computer-readable medium of claim 20 further including the instruction of providing geographic location as the environment information.

22. The computer-readable medium of claim 20 further including the instruction of providing local weather as the environment information.

23. The computer-readable medium of claim 20 further including the instruction of providing time and date as the environment information.

24. The computer-readable medium of claim 20 further including the instruction of personalizing which identifiers are pushed based on personalization information.

25. The computer-readable medium of claim 20 further including the instruction of providing URLs as the identifiers.

26. The computer-readable medium of claim 20 further including the instruction of sending a location specific welcome page (LSWP) to the wireless device for display.

27. The computer-readable medium of claim 20 further including the instruction of pushing keyword URLs to the wireless device for speech recognition matching.

28. The computer-readable medium of claim 20 further comprising (e) automatically pushing content from one or more of the identified web sites to the device in times when bandwidth is not in use to speed responsiveness of the device.

29. The computer-readable medium of claim 20 wherein the web site identifiers most likely to be requested are for web sites which have been most frequently requested by the users accessing the communication network when located in the current environment of the wireless device.

30. The computer-readable medium of claim 20 wherein the web site identifiers are categorized in types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

31. A method for generating and updating a URL database for providing a environment sensitive user interfaces on wireless devices capable of accessing the Internet, comprising the steps of:

(a) collecting information indicating which URLs are accessed by the wireless devices in what environments and categorizing the URLs according to environment;

(b) analyzing the information collected for each environment for patterns of use; and (c) forming a location URL database from the patterns of use.

32. The method of claim 31 further including the step of:

d) in response to determining a wireless device's environment, automatically transmitting URLs to the wireless device that will most likely be of interest to a user in that environment.

33. The method of claim 31 further including the step of providing geographic location as the environment information.

34. The method of claim 31 further including the step of providing local weather as the environment information.

35. The method of claim 31 further including the step of providing time and date as the environment information.

36. The method of claim 31 further including the step of personalizing which identifiers are pushed based on personalization information.

37. The method of claim 31 wherein the patterns of use are prior patterns of access of web sites in the environments of the wireless devices by users of the wireless devices.

38. The method of claim 37 wherein the analyzing the information for prior patterns of access include analyzing for web sites which have been most frequently requested by the users using the wireless devices when located in the categorized environments.

39. The method of claim 31 wherein the information is collected from a service provider coupled to the Internet and communicating with the wireless devices, wherein the collected information indicates which web sites have been accessed from which environments by the wireless devices.

40. A system for providing a location sensitive user interface to wireless devices, comprising:

a communication network;

a service provider;

a plurality of wireless devices in communication with the communication network through the service provider;

a location URL database; and a server in communication with the communication network for generating and updating the location URL database by:

collecting information from the wireless devices indicating which URLs are accessed from the wireless devices at what locations and categorizing the URLs according to location, analyzing the information collected for each location for patterns of use, and forming a location URL database from the patterns of use.

41. The system of claim 40 wherein the server automatically transmits URLs to each of the wireless devices that will most likely be of interest to a user at a geographic location of each respective device.

42. The system of claim 41 wherein the location information is collected from service provider of each of the wireless devices.

43. The system of claim 41 wherein the server categorizes the URLs according to type of location.

44. The system of claim 41 wherein the server assigns the URLs most widely accessed in any given location a higher priority.

45. The system of claim 40 wherein the server analyzes the access patterns according to other factors including at least one of time, weather, user preferences, and patterns of use in similar locations.

46. The system of claim 40 wherein the server performs the pattern of use analysis in real-time.

47. The system of claim 40 wherein the patterns of use are used to update the location URL database.

48. The method of claim 1 further comprising (e) automatically pushing content from one or more of the identified web sites to the device in times when bandwidth is not in use to speed responsiveness of the device.

49. The method of claim 1 wherein the web site identifiers pushed to the wireless devices are augmented with identifiers for web sites accessed from an environment similar to the environment of the wireless device.

50. The method of claim 1 wherein the web site identifiers most likely to be requested are for web sites which have been most frequently requested by the users accessing the communication network when located in the current environment of the wireless device.

51. The method of claim 1 wherein the web site identifiers are categorized in types of environments by collecting information from a service provider of the communications network, the server analyzing the collected information for each environment for patterns of use by the users accessing the communications network, wherein the information indicates which web sites have been accessed from which environments by a plurality of wireless devices of the communications network.

52. The method of claim 40 wherein the patterns of use are prior patterns of access of web sites at the locations of the wireless devices by users of the wireless devices.

* * * * *